(12) United States Patent
Zhao et al.

(10) Patent No.: US 11,991,010 B2
(45) Date of Patent: *May 21, 2024

(54) INFORMATION TRANSMISSION METHOD AND DEVICE AND STORAGE MEDIUM

(71) Applicant: GUANGDONG OPPO MOBILE TELECOMMUNICATIONS CORP., LTD., Guangdong (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/165,768

(22) Filed: Feb. 7, 2023

(65) Prior Publication Data

US 2023/0188274 A1    Jun. 15, 2023

Related U.S. Application Data

(63) Continuation of application No. 17/196,996, filed on Mar. 9, 2021, now Pat. No. 11,626,942, which is a (Continued)

(30) Foreign Application Priority Data

Sep. 17, 2018   (WO) .............. PCT/CN2018/106046

(51) Int. Cl.
*H04L 1/1867*   (2023.01)
*H04B 7/0417*   (2017.01)
(Continued)

(52) U.S. Cl.
CPC ......... *H04L 1/1896* (2013.01); *H04B 7/0417* (2013.01); *H04B 7/0486* (2013.01);
(Continued)

(58) Field of Classification Search
CPC ....... H04L 1/1896; H04L 1/0026; H04L 1/20; H04L 5/0023; H04L 5/0055;
(Continued)

(56) References Cited

U.S. PATENT DOCUMENTS

2009/0175187 A1   7/2009   Jersenius et al.
2014/0098719 A1*  4/2014   Kim ..................... H04L 5/0094
                                                    370/328
(Continued)

FOREIGN PATENT DOCUMENTS

CN   101854233 A   10/2010
CN   102271031 A   12/2011
(Continued)

OTHER PUBLICATIONS

International Search Report dated Jun. 17, 2019 of PCT/CN2018/111516 (4 pages).
(Continued)

*Primary Examiner* — Ayanah S George
(74) *Attorney, Agent, or Firm* — PERKINS COIE LLP (57) ABSTRACT

An information transmission method, comprising: receiving, by a network device, Acknowledgement (ACK)/Non-Acknowledgement (NACK) information sent by a first terminal device; wherein the ACK/NACK information is obtained by the first terminal device according to information of a second sidelink channel sent by a second terminal device and received by the first terminal device, the ACK/NACK information is used for indicating whether sidelink data sent by the first terminal device to the second terminal device is correctly received by the second terminal device, the second
(Continued)

A network device receives first indication information sent by a first terminal device    S301 sidelink channel comprises a sidelink feedback channel; sending downlink control information to the first terminal device, wherein the downlink control information carries second indication information, and the second indication information is used for determining a transmission resource for the ACK/NACK information.

20 Claims, 4 Drawing Sheets

Related U.S. Application Data continuation of application No. PCT/CN2018/111516, filed on Oct. 23, 2018.

(51) Int. Cl.
  *H04B 7/0456* (2017.01)
  *H04B 7/06* (2006.01)
  *H04W 92/18* (2009.01)
(52) U.S. Cl.
  CPC ......... *H04B 7/0617* (2013.01); *H04B 7/0626* (2013.01); *H04B 7/0632* (2013.01); *H04B 7/0639* (2013.01); *H04W 92/18* (2013.01)
(58) Field of Classification Search
  CPC ... H04L 5/0057; H04L 1/1671; H04L 5/0053; H04L 1/0023; H04B 7/0417; H04B 7/0486; H04B 7/0617; H04B 7/0626; H04B 7/0632; H04B 7/0639; H04B 7/0456; H04B 7/0621; H04W 92/18; H04W 52/143; H04W 52/365; H04W 72/21; H04W 4/40; H04W 72/23; H04W 72/542; H04W 28/0278
  See application file for complete search history.

(56) References Cited

U.S. PATENT DOCUMENTS

| | | | |
|---|---|---|---|
| 2015/0023267 A1* | 1/2015 | Lim | H04L 1/1854 370/329 |
| 2015/0078279 A1 | 3/2015 | Ko et al. | |
| 2015/0189644 A1 | 7/2015 | Lorca Hernando | |
| 2016/0309510 A1 | 10/2016 | Wong et al. | |
| 2017/0019942 A1 | 1/2017 | Ko et al. | |
| 2018/0206176 A1* | 7/2018 | Panteleev | H04W 28/04 |
| 2019/0045499 A1* | 2/2019 | Huang | H04L 5/0053 |
| 2020/0022089 A1* | 1/2020 | Guo | H04L 1/1812 |

FOREIGN PATENT DOCUMENTS

| | | | |
|---|---|---|---|
| CN | 105471544 A | 4/2016 | |
| JP | 2017527185 A | 9/2017 | |
| JP | 2018026626 A | 2/2018 | |
| WO | 2013171152 A1 | 11/2013 | |
| WO | 2016076301 A1 | 5/2016 | |

OTHER PUBLICATIONS

International Search Report dated Apr. 28, 2019 of PCT/CN2018/106046 (4 pages).
Examination Report No. 1 for Australian Application No. 2018442433 dated Nov. 3, 2021. 4 pages.
Extended European Search Report for European Application No. 18933792.6 dated Sep. 23, 2021. 8 pages.
Examination Report for Indian Application No. 202117012655 dated Feb. 3, 2022. 7 pages with English translation.
Examination Report No. 2 for Australian Application No. 2018442433 dated Apr. 6, 2022. 3 pages.
Notice of Reasons for Refusal for Japanese Application No. 2021-813212 dated Apr. 19, 2022. 6 pages with English translation.
Notification of Reason for Refusal for Korean Application No. 10-2021-7008203 dated Feb. 8, 2022. 15 pages with English translation.
ZTE "Sidelink Feedback of FeD2D Relay" R1-1712921; 3GPP TSG RAN WG1 Meeting #90; Prague, Czech Republic, Aug. 21-25, 2017. 6 pages.
First Office Action for Chinese Application No. 202110417598.4 dated Jul. 27, 2022. 16 pages with English translation.
Notice of Final Rejection for Korean Application No. 10-2021-7008203 dated Aug. 31, 2022. 9 pages with English translation.
Notice of Reasons for Refusal for Japanese Application No. 2021-513212 dated Aug. 26, 2022. 4 pages with English translation.
Extended European Search Report for European Application No. 22198833.0 dated Jan. 2, 2023. 8 pages.
Office Action for Taiwanese Application No. 108132869 dated Nov. 7, 2022. 15 pages with English translation.
Request for Submission of an Opinion for Korean Application No. 2021-7008203 dated Dec. 7, 2022. 11 pages with English translation.
Written Opinion dated Apr. 28, 2019y with English translation in App. PCT/CN2018/106046.
Written Opinion dated Jun. 17, 2019 with English translation, in App. PCT/CN2018/111516.
Decision to Grant Patent dated Jan. 17, 2023 in Japan App. 2021-513212, with English translation, 5 pages.
Non-Final Office Action dated May 14, 2021 of U.S. Appl. No. 17/196,996, filed Mar. 9, 2021.
Non-Final Office Action dated Aug. 25, 2021 of U.S. Appl. No. 17/196,996.
Final Office Action dated Jan. 4, 2022 of U.S. Appl. No. 17/196,996.
Non-Final Office Action dated Aug. 1, 2022 of U.S. Appl. No. 17/196,996.
Notice of Allowance dated Dec. 7, 2022 of U.S. Appl. No. 17/196,996.
First Office Action of the European application No. 22198833.0, dated Aug. 31, 2023. 7 pages.
Hearing notice issued for Indian application No. 202117012655, 2 pages.

\* cited by examiner

A first terminal device sends first indication information to a network device  /S201

FIG. 4

A network device receives first indication information sent by a first terminal device  /S301

INFORMATION TRANSMISSION METHOD AND DEVICE AND STORAGE MEDIUM

CROSS-REFERENCE TO RELATED APPLICATION

This application is a continuation application of U.S. application Ser. No. 17/196,996 filed on Mar. 9, 2021, which is a continuation application of International PCT Application No. PCT/CN2018/111516, having an international filing date of Oct. 23, 2018, which claims priority to PCT Application No. PCT/CN2018/106046, filed on Sep. 17, 2018. The present application claims priorities and benefits of the above-identified applications and the above-identified applications are incorporated by reference herein in their entireties.

TECHNICAL FIELD

The present disclosure relates to the technical field of wireless communication, and in particular, to an information transmission method, a device and a storage medium.

BACKGROUND

Autopilot needs to be supported in Vehicle to Everything (V2X) of a 5th Generation (5G) New Radio (NR) system. For this reason, higher requirements are put forward for data interaction between vehicles, such as better throughput, lower delay, higher reliability, larger coverage range and more flexible resource allocation.

In the NR V2X, transmission resources for sending sidelink data may be allocated by the network. In a sidelink unicast communication, when a sending end of the sidelink data sends sidelink data to a receiving end, the receiving end of sidelink data needs to send feedback information to the data sending end, and the data sending end needs to send the feedback information to a network device so that the network device can configure transmission parameters or allocate resources based on the feedback information. However, currently there is no effective solution about how the data sending end sends the feedback information to the network device.

SUMMARY

In order to solve the above technical problems, implementations of the present disclosure provide an information transmission method, a device and a storage medium, in which a data sending end can send to a network device feedback information sent by a data receiving end.

In a first aspect, an implementation of the present disclosure provides an information transmission method, including: a first terminal device sends first indication information to a network device, wherein the first indication information carries first information, and the first information includes at least one of the following: Acknowledgement/Non-Acknowledgement information; Beam index information; Channel Quality Indicator Information; Channel State Indicator information; Precoding Matrix Indicator information; rank indicator information; and power indicator information.

Herein the Acknowledgement/Non-Acknowledgement information is used for indicating whether sidelink data sent by the first terminal device to a second terminal device is correctly received by the second terminal device; the beam index information is used for indicating a beam used by the first terminal device for sending the sidelink data to the second terminal device; the Channel Quality Indicator Information is used for indicating a channel quality between the first terminal device and the second terminal device; the Channel State Indicator information is used for indicating a channel state between the first terminal device and the second terminal device; the Precoding Matrix Indicator information is used for indicating precoding information used by the first terminal device for sending the sidelink data to the second terminal device; the rank indicator information is used for indicating rank information used by the first terminal device for sending the sidelink data to the second terminal device; the power indicator information is used for indicating to increase or decrease power, or to indicate power headroom information.

In a second aspect, an implementation of the present disclosure provides an information transmission method, including: a network device receives first indication information sent by a first terminal device, wherein the first indication information carries first information, and the first information is used for the network device to configure transmission parameters or allocate resources; the first information includes at least one of the following: Acknowledgement/Non-Acknowledgement information; Beam index information; Channel Quality Indicator Information; Channel State Indicator information; Precoding Matrix Indicator information; rank indicator information; and power indicator information.

Herein the Acknowledgement/Non-Acknowledgement information is used for indicating whether sidelink data sent by the first terminal device to a second terminal device is correctly received by the second terminal device; the beam index information is used for indicating a beam used by the first terminal device for sending the sidelink data to the second terminal device; the Channel Quality Indicator Information is used for indicating a channel quality between the first terminal device and the second terminal device; the Channel State Indicator information is used for indicating a channel state between the first terminal device and the second terminal device; the Precoding Matrix Indicator information is used for indicating precoding information used by the first terminal device for sending the sidelink data to the second terminal device; the rank indicator information is used for indicating rank information used by the first terminal device for sending the sidelink data to the second terminal device; the power indicator information is used for indicating to increase or decrease power, or to indicate power headroom information.

In a third aspect, an implementation of the present disclosure provides a first terminal device, including: a first sending unit configured to send first indication information to a network device, wherein the first indication information carries first information, and the first information includes at least one of the following: Acknowledgement/Non-Acknowledgement information; Beam index information; Channel Quality Indicator Information; Channel State Indicator information; Precoding Matrix Indicator information; rank indicator information; and power indicator information.

Herein the Acknowledgement/Non-Acknowledgement information is used for indicating whether sidelink data sent by the first terminal device to a second terminal device is correctly received by the second terminal device; the beam index information is used for indicating a beam used by the first terminal device for sending the sidelink data to the second terminal device; the Channel Quality Indicator Information is used for indicating a channel quality between the first terminal device and the second terminal device; the Channel State Indicator information is used for indicating a channel state between the first terminal device and the second terminal device; the Precoding Matrix Indicator information is used for indicating precoding information used by the first terminal device for sending the sidelink data to the second terminal device; the rank indicator information is used for indicating rank information used by the first terminal device for sending the sidelink data to the second terminal device; the power indicator information is used for indicating to increase or decrease power, or to indicate power headroom information.

In a fourth aspect, an implementation of the present disclosure provides a network device, including: a fourth receiving unit configured to receive first indication information sent by a first terminal device, wherein the first indication information carries first information, and the first information is used for the network device to configure transmission parameters or allocate resources; the first information includes at least one of the following: Acknowledgement/Non-Acknowledgement information; Beam index information; Channel Quality Indicator Information; Channel State Indicator information; Precoding Matrix Indicator information; rank indicator information; and power indicator information.

Herein the Acknowledgement/Non-Acknowledgement information is used for indicating whether sidelink data sent by the first terminal device to a second terminal device is correctly received by the second terminal device; the beam index information is used for indicating a beam used by the first terminal device for sending the sidelink data to the second terminal device; the Channel Quality Indicator Information is used for indicating a channel quality between the first terminal device and the second terminal device; the Channel State Indicator information is used for indicating a channel state between the first terminal device and the second terminal device; the Precoding Matrix Indicator information is used for indicating precoding information used by the first terminal device for sending the sidelink data to the second terminal device; the rank indicator information is used for indicating rank information used by the first terminal device for sending the sidelink data to the second terminal device; the power indicator information is used for indicating to increase or decrease power, or to indicate power headroom information.

In a fifth aspect, an implementation of the present disclosure provides a terminal device, including a processor and a memory configured to store a computer program which is runnable on the processor, wherein the processor is configured to perform the acts of the above information transmission method performed by the first terminal device when running the computer program.

In a sixth aspect, an implementation of the present disclosure provides a terminal device, including a processor and a memory configured to store a computer program which is runnable on the processor, wherein the processor is configured to perform the acts of the above information transmission method performed by the network device when running the computer program.

In a seventh aspect, an implementation of the present disclosure provides a storage medium storing an executable program which, when executed by a processor, implements the above information transmission method performed by the first terminal device.

In an eighth aspect, an implementation of the present disclosure provides a storage medium storing an executable program which, when executed by a processor, implements the above information transmission method performed by the network device.

According to the information transmission method, device and storage medium provided by the implementations of the present disclosure, the first terminal device sends the first indication information to the network device, and the first indication information carries the first information, wherein the first information is feedback information for sidelink data transmitted between the first terminal device and the second terminal device. In this way, it is realized that in NR V2X, the data sending end sends the feedback information for the sidelink data to the network device, so that the network device can schedule resources or configure transmission parameters according to the first information.

DETAILED DESCRIPTION

In order to understand features and technical contents of implementations of the present disclosure in more detail, implementation modes of the implementations of the present disclosure will be described in detail below with reference to accompanying drawings, and the accompanying drawings are used for reference only but are not intended to limit the implementations of the present disclosure.

The information transmission method of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a 5G system, or the like.

Figure 1:
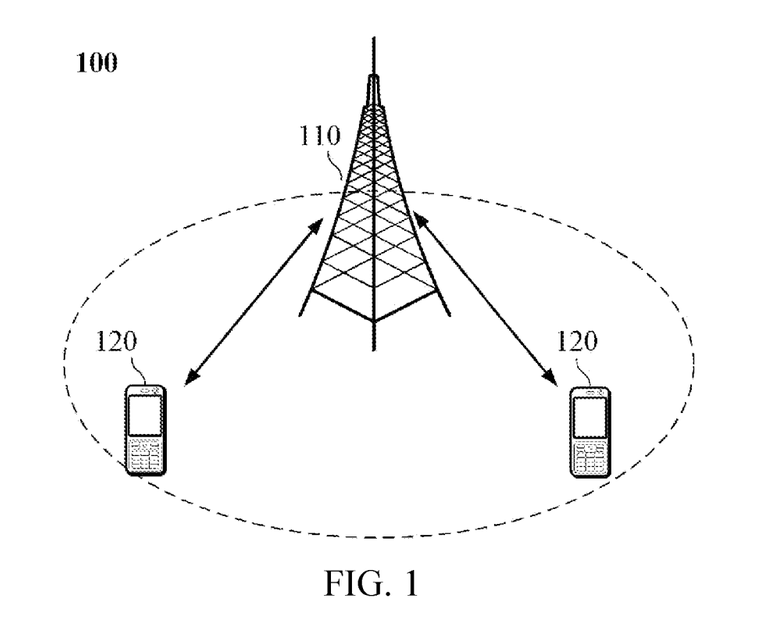
FIG. 1 is a schematic diagram of a composition structure of a communication system of an implementation of the present disclosure.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, a gNB in a New Radio system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage range of the network device 110. As used herein, the term "terminal device" includes, but is not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, a Device to Device (D2D) communication may be performed between the terminal devices 120.

Optionally, the 5G system or 5G network may be referred to as a New Radio (NR) system or an NR network.

FIG. 1 shows one network device and two terminal devices as an example. Optionally, the wireless communication system 100 may include multiple network devices, and other quantity of terminal devices may be included within the coverage range of each network device, and this is not limited in the implementations of the present disclosure.

Optionally, the communication system 100 may include other network entities such as a network controller, a mobile management entity and the like, and this is not limited in the implementations of the present disclosure.

It should be understood that, a device with a communication function in a network/system in the implementation of the present disclosure may be referred to as a communication device. The communication system 100 shown in FIG. 1 is taken as an example, the communication device may include a network device 110 and a terminal device 120 which have communication functions, and the network device 110 and the terminal device 120 may be the specific devices described above, which will not be described here again. The communication device may also include other devices in the communication system 100, such as network controllers, mobile management entities, and other network entities, and this is not limited in the implementations of the present disclosure.

Before describing the implementations of the present disclosure in detail, an Internet of Vehicles system will be briefly explained.

The Internet of Vehicles system is a SideLink (SL) transmission technology based on a Device to Device (D2D) communication. Different from the mode in a conventional LTE system in which communication data is received or sent through a base station, the Internet of Vehicles system uses a mode of a D2D direct communication for the communication data, and therefore has a higher spectrum efficiency and a lower transmission latency.

In Release 14 (Rel-14) of the 3rd generation partnership project (3GPP), the V2X is standardized, and two transmission modes are defined: mode 3 and mode 4.

Figure 2:
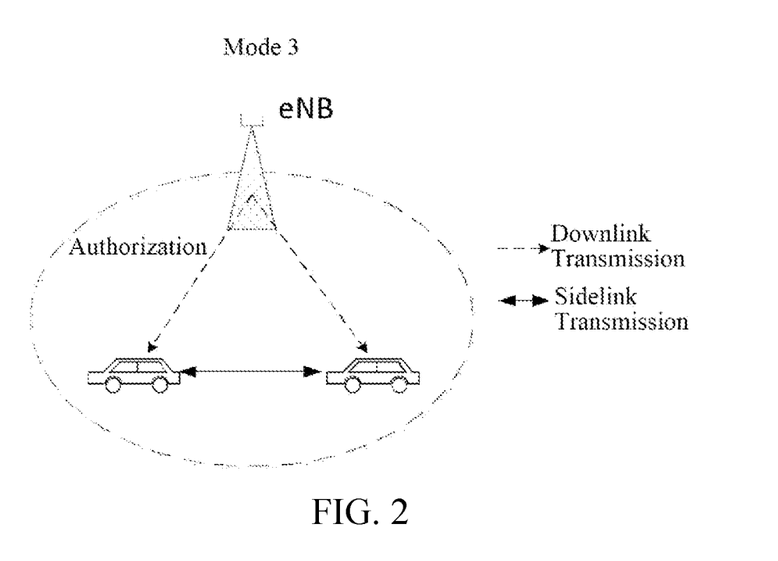
FIG. 2 is a schematic diagram of a processing flow of data transmission in mode 3 of the present disclosure.

With regard to mode 3, in a data transmission flow as shown in FIG. 2, a sidelink transmission resource of a vehicle-mounted terminal is allocated by a base station. The vehicle-mounted terminal sends data on a sidelink according to the resource allocated by the base station, and the base station may allocate, to the terminal, a resource for a single transmission or a resource for semi-static transmission.

Figure 3:
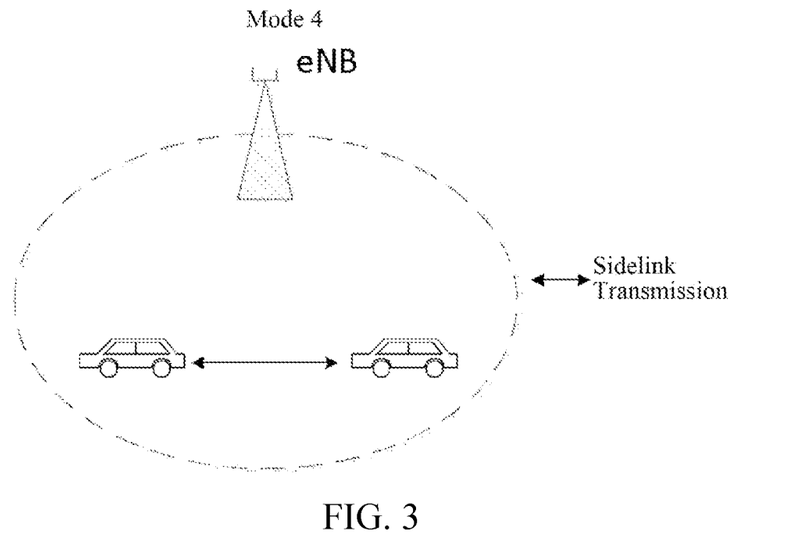
FIG. 3 is a schematic diagram of a processing flow of data transmission in mode 4 of the present disclosure.

With regard to mode 4, in a data transmission flow as shown in FIG. 3, the vehicle-mounted terminal adopts a transmission mode of sensing and reservation. The vehicle-mounted terminal acquires a set of available transmission resources in a resource pool by sensing, and the terminal randomly selects a resource from the set for sidelink data transmission. Because services in the Internet of Vehicles system have a periodicity feature, the vehicle terminal generally uses a semi-static transmission manner. That is, after selecting a transmission resource, the terminal continually uses the resource in a plurality of transmission cycles, thereby reducing probabilities of resource re-selection and resource conflict. The terminal will carry information of a resource reserved for next transmission in the control information of a current transmission, so that other terminals can determine whether a resource is reserved and used by a user by detecting the control information of the user, thus achieving a purpose of reducing resource conflicts.

Autopilot needs to be supported in the NR-V2X. For this reason, higher requirements are made for data interaction between vehicles, such as greater throughput, lower delay, higher reliability, larger coverage range and more flexible resource allocation.

In the NR-V2X, it is also necessary to support multiple transmission modes, such as unicast, multicast and broadcast. In unicast transmission, feedback information, such as Acknowledgment (ACK)/Non-Acknowledgment (NACK) information and Channel Quality Indicator (CQI) information, needs to be sent from a terminal device for data receiving to a terminal device for data sending. According to the feedback information of the terminal device for data receiving, the terminal device for data sending can adjust a Modulation and Coding Scheme (MCS) level and determine whether a retransmission is needed.

In the NR-V2X, the transmission resources of the sidelink may be allocated by a network device. On the sidelink, a terminal device for data receiving sends feedback information to a terminal device for data sending, the feedback information includes ACK/NACK, CQI, Channel State Information (CSI), power adjustment information, etc. The terminal device for sending needs to send the feedback information to the network device, so as to assist the resource scheduling and transmission parameter configuration of the network device. The network device determines whether the data on the sidelink is correctly received by the terminal device for data receiving according to the feedback information from the terminal device for data sending, so as to allocate resources to the terminal device for data sending for new data transmission or retransmission, or the terminal device for data sending sends the CSI/CQI and other information to the network device to assist the network device in the transmission parameter configuration, for example, configuring MCS used by the sidelink. However, there is no effective solution about how the terminal device for data sending sends the feedback information to the network device.

Figure 4:
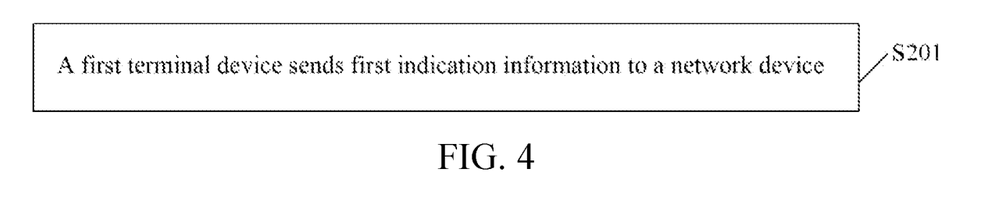
FIG. 4 is a schematic diagram of an optional processing flow of an information transmission method applied to a first terminal device according to an implementation of the present disclosure.

As for the above problems, as shown in FIG. 4, an optional processing flow of an information transmission method applied to a terminal device provided by an implementation of the present disclosure includes the following act S201.

S201, a first terminal device sends first indication information to a network device.

In some implementations, the first indication information carries first information, wherein the first information at least includes at least one of the following:

1) ACK/NACK information, which is used for indicating whether sidelink data sent by the first terminal device to a second terminal device is correctly received by the second terminal device;
2) beam index information, which is used for indicating the beam used by the first terminal device for sending the sidelink data to the second terminal device;
3) CQI information, which is used for indicating a channel quality between the first terminal device and the second terminal device;
4) CSI information, which is used for indicating a channel state between the first terminal device and the second terminal device;
5) Precoding Matrix Indicator (PMI) information, which is used for indicating precoding information used by the first terminal device for sending the sidelink data to the second terminal device;
6) Rank indicator information, which is used for indicating rank information used by the first terminal device for sending the sidelink data to the second terminal device;
7) Power indicator information, which is used for indicating to increase or decrease power, or for indicating power headroom information;
8) a candidate resource set, which is a set of available transmission resources obtained by the first terminal device through sensing on the sidelink. For example, the network device allocates to the first terminal device a sidelink transmission resource from a first resource pool, and before the network device allocates the transmission resource to the first terminal device, the first terminal device determines the candidate resource set from the first resource pool by sensing, and each resource in the candidate resource set is a transmission resource that can be used by the first terminal device for transmitting sidelink data. For example, the candidate resource set is a set composed of N transmission resources with the lowest energy in a resource selection window. The first terminal device sends the candidate resource set to the network device to assist the network device in resource scheduling.

The specific implementation mode of the first terminal device sending the first indication information to the network device at least includes: the first terminal device sends an uplink control channel to the network device, wherein the uplink control channel carries the first indication information. Or, the first terminal device sends an uplink data channel to the network device, wherein the uplink data channel carries the first indication information. Or, the first terminal device sends uplink Radio Resource Control (RRC) signaling to the network device, wherein the RRC signaling carries the first information. Or, the first terminal device sends a Scheduling Request (SR) to the network device, wherein the SR carries the first indication information. Or, the first terminal device sends a Buffer Status Report (BSR) to the network device, wherein the BSR carries the first indication information.

When the first indication information is sent by the first terminal device to the network device through sending the uplink control channel, the first indication information may be carried by a Physical Uplink Control Channel (PUCCH). Furthermore, the number of bits of information that can be transmitted in different PUCCH formats is different. Therefore, different contents included in the first indication information can be carried in the corresponding PUCCH formats.

For example, if the number of bits included in the first indication information is less than or equal to 2, the first indication information may be carried in a first PUCCH format; and if the number of bits included in the first indication information is greater than 2, the first indication information may be carried in a second PUCCH format.

Optionally, when the first indication information is sent by the first terminal device to the network device through sending the uplink control channel, the first terminal device also receives Downlink Control Information (DCI) sent by the network device, wherein the Downlink Control Information is used for allocating a sidelink transmission resource to the first terminal device. The downlink control information carries second indication information, wherein the second indication information is used for determining a transmission resource of the uplink control channel.

For example, the network device sends configuration information to the first terminal device, wherein the configuration information is used for configuring a transmission resource set of the PUCCH. The network device allocates the transmission resources of the sidelink to the first terminal device through the DCI, wherein the DCI may carry second indication information, which is used for determining a transmission resource of the PUCCH in combination with the above configuration information. Specifically, for example, the second indication information includes index information, which is used for determining one transmission resource from multiple PUCCH transmission resources which are configured by the network. Or the second indication information is used for indicating a time interval between the PUCCH and the DCI, and further, a frequency domain resource of the PUCCH can be indicated, so the PUCCH transmission resource for transmitting the feedback information can be determined.

The above description takes the configuration information for configuring the transmission resource set of PUCCH as an example, and in a specific implementation, the configuration information can also be used for configuring a transmission resource set of PUSCH. Specifically, the network device allocates the transmission resource of the sidelink to the first terminal device through the DCI, and the DCI may carry the second indication information, which is used for determining the transmission resources of the PUSCH in combination with the above configuration information. Specifically, for example, the second indication information includes index information which is used for determining a transmission resource from multiple PUSCH transmission resources configured by the network. Or the second indication information is used for indicating a time interval between the PUSCH and the DCI, and further, the frequency domain resource of the PUSCH can be indicated, so that the transmission resource of the PUSCH for transmitting the feedback information can be determined.

Optionally, when the first indication information is sent by the first terminal device through sending an uplink data channel to the network device, the first indication information is carried on the uplink data channel by puncturing the uplink data channel. Taking the first indication information including ACK/NACK information as an example, the ACK/NACK information required to be sent to the network device can be encoded, and the resources of the PUSCH channel are punched with the encoded bits. That is, data symbols of PUSCH are replaced by the encoded ACK/NACK symbols.

For example, in an LTE system, a frame structure of the PUSCH is that the 4th and 11th time domain symbols in a subframe are used for transmitting a demodulation reference signal (DMRS), and other time domain symbols except the 4th and 11th time domain symbols can be used for transmitting the PUSCH. If the frequency domain resources allocated by the network to the first terminal device for transmitting PUSCH are four physical resource blocks (PRBs), the first terminal device first maps PUSCH data to all transmission resources except the DMRS symbols, and then replaces PUSCH data symbols with symbols obtained by encoding ACK/NACK, that is, punches PUSCH data with ACK/NACK symbols. For example, the PUSCH data on a next symbol (i.e., the 5th time domain symbol) following the first DMRS time domain symbol is replaced by the encoded ACK/NACK symbols.

Optionally, when the first indication information is sent by the first terminal device through sending an uplink data channel to the network device, the first indication information is carried on the uplink data channel in a manner of rate matching.

For example, the terminal device determines the number of resources occupied by the information to be fed back according to parameter configuration (such as MCS, etc.), then maps encoded feedback information to corresponding transmission resources, and maps PUSCH data and reference signals to other resources. In the above, the resources that can be used by PUSCH data are the remaining transmission resources in the transmission resources allocated through the network except the resources occupied by feedback information, pilot signals and the like.

Optionally, when the first indication information is sent by the first terminal device through sending an SR to the network device, taking the first indication information as ACK/NACK information as an example, the network device configures two sets of SR resources for the first terminal device, and if the first terminal device sends the SR on the first set of SR resources, it means that the first terminal device sends ACK information; and if the first terminal device sends the SR on the second set of SR resources, it means that the first terminal device sends NACK information. With the above implementations, the first terminal device can implicitly send ACK information or NACK information to the network device.

Optionally, the first indication information further includes at least one of the following:
identification information of the second terminal device;
group identification information; and
the first identification information.

The group identification information is identification information of the group where the first terminal device belongs, and the first identification information is link identification information for a unicast communication between the first terminal device and the second terminal device.

Optionally, the first indication information further includes at least one of the following:
Reference Signal Received Power (RSRP), Reference Signal Received Quality (RSRQ), Received Signal Strength Indicator (RSSI), interference indication information, and path loss information.

It should be understood that the RSRP in the above solution is a sidelink RSRP, the RSRQ is a sidelink RSRQ, the RSSI is a sidelink RSSI, the interference indication information is used for indicating an interference of a sidelink, and the path loss information indicates a path loss of a sidelink between the first terminal device and the second terminal device.

In another implementation, before the first terminal device performs act S201, the method further includes:

S200, a first terminal device receives a first sidelink channel sent by a second terminal device, wherein the first sidelink channel carries first indication information.

In the above, the first sidelink channel may be for transmission of a Physical Sidelink Control Channel (PSCCH), a Physical Sidelink Shared Channel (PSSCH), or a sidelink feedback channel.

For example, the second terminal device receives sidelink data sent by the first terminal device and sends feedback information, such as ACK/NACK information or CSI/CQI information, to the first terminal device.

Optionally, the second terminal device receives the sidelink channel or measurement signal sent by the first terminal device, and obtains information such as CSI, CQI, RI, PMI in the first indication information, or the second terminal device obtains information such as RSRP, RSRQ, RSSI, path loss information, interference information included in the first indication information through measurement. The second terminal device carries the first indication information obtained in either or both of the above two manners in the first sidelink channel and sends it to the first terminal device, and the first terminal device then sends the first indication information to the network device.

In another implementation, before the first terminal device performs act S201, the method further includes:

S200', the first terminal device receives a second sidelink channel and/or measurement signal sent by the second terminal device, and the first terminal device obtains the first indication information according to the second sidelink channel and/or measurement signal.

In the above, the second sidelink channel may be PSCCH, PSSCH, sidelink feedback channel, Physical Sidelink Discovery Channel (PSDCH), or reference signal, wherein the reference signal may be a Channel State Information Reference Signal (CSI-RS) or a Sounding Reference Signal (SRS), etc.

The measurement signal includes at least one of the following: Demodulation Reference Signal (DMRS), Channel State Indicator Reference Signal (CSI-RS), Sounding Reference Signal and Phase Tracking Reference Signal (PT-RS).

In a specific implementation, the first terminal device obtains information such as CSI, CQI, RI, PMI in the first indication information according to the second sidelink channel and/or measurement signal sent by the second terminal device; or the first terminal device obtains information such as RSRP, RSRQ, RSSI, path loss information, interference information included in the first indication information according to the second side channel and/or measurement signal sent by the second terminal device. The first terminal device sends the obtained first indication information to the network device to achieve an effective and reasonable resource scheduling for the network device.

Figure 5:
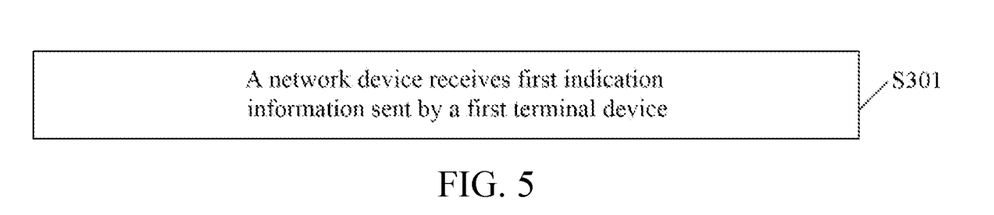
FIG. 5 is a schematic diagram of an optional processing flow of an information transmission method applied to a network device according to an implementation of the present disclosure.

As shown in FIG. 5, an optional processing flow of an information transmission method applied to a network device provided by an implementation of the present disclosure includes following act S201.

In S301, a network device receives first indication information sent by a first terminal device.

In a specific implementation, the specific implementation mode of the network device receiving the first indication information sent by the first terminal device at least includes: the network device receives an uplink control channel sent by the first terminal device, wherein the uplink control channel carries the first indication information. Or, the network device receives an uplink data channel sent by the first terminal device, wherein the uplink data channel carries the first indication information. Or, the network device receives an uplink RRC signaling sent by the first terminal device, wherein the uplink RRC signaling carries the first information. Or, the network device receives an SR sent by the first terminal device, wherein the SR carries the first indication information. Or, the network device receives a BSR sent by the first terminal device, wherein the BSR carries the first indication information.

Here, the related description for the first indication information is the same as the related description for the first indication information in act S201. The way in which the network device obtains the first indication information is the same as the way in which the first terminal device sends the first indication information in act S201, which will not be repeated in detail here.

It should be noted that, in the implementations of the present disclosure, the first terminal device may be a data sending end during data transmission in an Internet of Vehicles system. The second terminal device may be a data receiving end during data transmission in an Internet of Vehicles system.

An implementation of the present disclosure further provides an information transmission method applied to a communication system, wherein the communication system includes a first terminal device, a second terminal device and a network device. In the above, the first terminal device is a data sending end in an Internet of Vehicles system, and the second terminal device is a data receiving end in the Internet of Vehicles system. The method includes following acts.

In act 1, the second terminal device sends first indication information to the first terminal device.

In some implementations, the second terminal device sends a first sidelink channel to the first terminal device, wherein the first sidelink channel carries the first indication information.

In other implementations, the second terminal device sends a second sidelink channel to the first terminal device, and the first terminal device obtains the first indication information according to the second sidelink channel.

Here, each of the first sidelink channel and the second sidelink channel may be a PSCCH, a PSSCH, a sidelink feedback channel or the like.

In act 2, the first terminal device sends the first indication information to the network device.

In act 3, the network device receives the first indication information.

In an implementation of the present disclosure, the network device configures transmission parameters or allocates resources according to the received first indication information.

Figure 6:
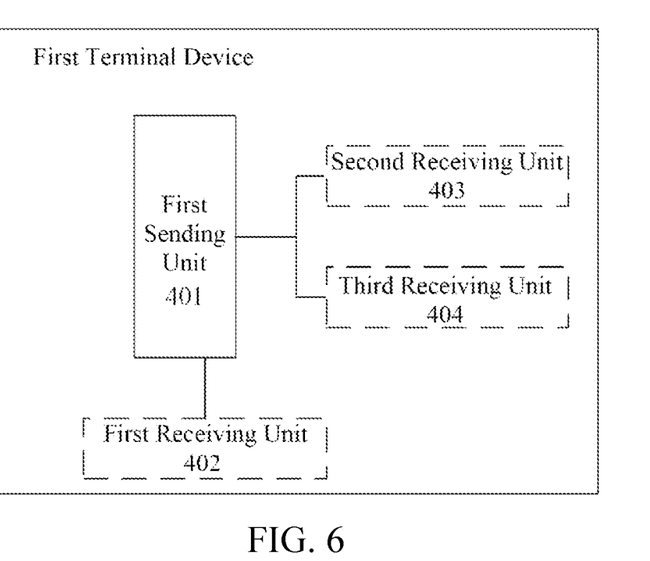
FIG. 6 is a schematic diagram of a composition structure of a first terminal device of an implementation of the present disclosure.

An implementation of the present disclosure further provides a first terminal device, wherein the composition structure of the first terminal device are as shown in FIG. 6, including: a first sending unit 401 configured to send first indication information to a network device.

In some implementations, the first information includes at least one of the following:
1) ACK/NACK information, which is used for indicating whether sidelink data sent by the first terminal device to the second terminal device is correctly received by the second terminal device;
2) beam index information, which is used for indicating the beam used by the first terminal device for sending the sidelink data to the second terminal device;
3) CQI information, which is used for indicating a channel quality between the first terminal device and the second terminal device;
4) CSI information, which is used for indicating a channel state between the first terminal device and the second terminal device;
5) PMI information, which is used for indicating precoding information used by the first terminal device for sending the sidelink data to the second terminal device;
6) Rank indicator information, which is used for indicating rank information used by the first terminal device for sending the sidelink data to the second terminal device;
7) Power indicator information, which is used for indicating to increase or decrease power, or for indicating power headroom information;
8) a candidate resource set, which is a set of available transmission resources obtained by the first terminal device through sensing on the sidelink. For example, the network device allocates to the first terminal device a sidelink transmission resource from a first resource pool, and before the network device allocates the transmission resource to the first terminal device, the first terminal device determines the candidate resource set from the first resource pool by sensing, and each resource in the candidate resource set is a transmission resource that can be used by the first terminal device for transmitting sidelink data. For example, the candidate resource set is a set composed of N transmission resources with the lowest energy in a resource selection window. The first terminal device sends the candidate resource set to the network device to assist the network device in resource scheduling.

Optionally, the first indication information further includes at least one of the following:

identification information of the second terminal device, group identification information, and first identification information. In the above, the group identification information is identification information of the group where the first terminal device belongs, and the first identification information is link identification information for a unicast communication between the first terminal device and the second terminal device.

Optionally, the first indication information also includes at least one of the following: RSRP, RSRQ, RSSI, interference indication information and path loss information.

In an implementation, the first sending unit 401 is configured to send an uplink control channel to the network device, wherein the uplink control channel carries the first indication information.

In this case, the first terminal device further includes a first receiving unit 402 configured to receive downlink control information, wherein the downlink control information carries second indication information, and the second indication information is used for determining a transmission resource of the uplink control channel. The downlink control information is used for allocating a sidelink transmission resource to the first terminal device.

In an implementation, the first sending unit 401 is configured to send an uplink data channel to the network device, wherein the uplink data channel carries the first indication information.

In the above, the first indication information is carried on the uplink data channel by punching the uplink data channel. Or, the first indication information is carried on the uplink data channel in a manner of rate matching.

In an implementation, the first sending unit 401 is configured to send an uplink radio resource control signaling to the network device, wherein the uplink radio resource control signaling carries the first information.

In an implementation, the first sending unit 401 is configured to send a scheduling request to the network device, wherein the scheduling request carries the first indication information.

In an implementation, the first sending unit 401 is configured to send a buffer status report to a network device, wherein the buffer status report carries the first indication information.

In an implementation, the first terminal device further includes a second receiving unit 403 configured to receive a first sidelink channel sent by the second terminal device, wherein the first sidelink channel carries the first indication information.

In an implementation, the first terminal device further includes a third receiving unit 404 configured to receive a second sidelink channel and/or measurement signal sent by the second terminal device, and obtain the first indication information according to the second sidelink channel and/or measurement signal.

In the above, each of the first sidelink channel and the second sidelink channel may be a PSCCH, a PSSCH or a sidelink feedback channel.

Figure 7:
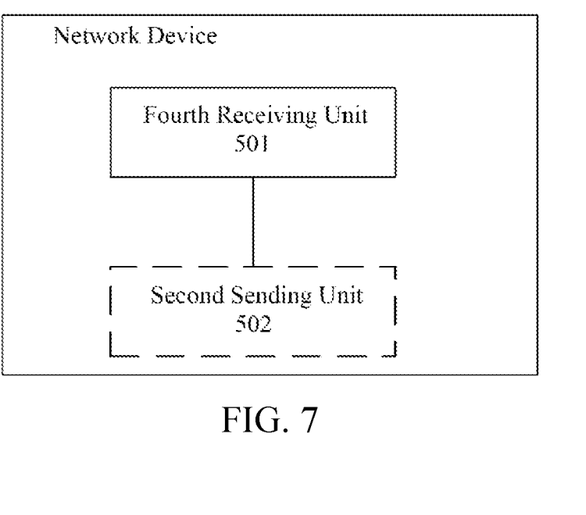
FIG. 7 is a schematic diagram of a composition structure of a network device according to an implementation of the present disclosure.

An implementation of the present disclosure further provides a network device, wherein the composition structure of the network device are as shown in FIG. 7, including: a fourth receiving unit 501 configured to receive first indication information sent by a first terminal device, wherein the first indication information carries first information, and the first information is used by the network device for configuring transmission parameters or allocating resources.

In some implementations, the first information includes at least one of the following:
1) ACK/NACK information, which is used for indicating whether sidelink data sent by the first terminal device to the second terminal device is correctly received by the second terminal device;
2) beam index information, which is used for indicating the beam used by the first terminal device for sending the sidelink data to the second terminal device;
3) CQI information, which is used for indicating a channel quality between the first terminal device and the second terminal device;
4) CSI information, which is used for indicating a channel state between the first terminal device and the second terminal device;
5) PMI information, which is used for indicating precoding information used by the first terminal device for sending the sidelink data to the second terminal device;
6) Rank indicator information, which is used for indicating rank information used by the first terminal device for sending the sidelink data to the second terminal device;
7) Power indicator information, which is used for indicating to increase or decrease power, or for indicating power headroom information;
8) a candidate resource set, which is a set of available transmission resources obtained by the first terminal device through sensing on the sidelink. For example, the network device allocates to the first terminal device a sidelink transmission resource from a first resource pool, and before the network device allocates the transmission resource to the first terminal device, the first terminal device determines the candidate resource set from the first resource pool by sensing, and each resource in the candidate resource set is a transmission resource that can be used by the first terminal device for transmitting sidelink data. For example, the candidate resource set is a set composed of N transmission resources with the lowest energy in a resource selection window. The first terminal device sends the candidate resource set to the network device to assist the network device in resource scheduling.

Optionally, the first indication information further includes at least one of the following:
identification information of the second terminal device, group identification information, and first identification information.

In the above, the group identification information is identification information of the group where the first terminal device belongs, and the first identification information is link identification information for a unicast communication between the first terminal device and the second terminal device.

Optionally, the first indication information further includes at least one of the following:
RSRP, RSRQ, RSSI, interference indication information and path loss information.

In an implementation, the fourth receiving unit 501 is configured to receive an uplink control channel sent by a first terminal device, wherein the uplink control channel carries the first indication information.

In this case, the network device further includes a second sending unit 502 configured to send downlink control information to the first terminal device, wherein the downlink control information carries second indication information, and the second indication information is used for determining a transmission resource of the uplink control channel.

The downlink control information is used for allocating a sidelink transmission resource to the first terminal device.

In an implementation, the fourth receiving unit 501 is configured to receive an uplink data channel sent by the first terminal device, wherein the uplink data channel carries the first indication information.

In the above, the first indication information is carried on the uplink data channel by punching the uplink data channel. Or, the first indication information is carried on the uplink data channel in a manner of rate matching.

In an implementation, the fourth receiving unit 501 is configured to receive an uplink radio resource control signaling sent by the first terminal device, wherein the uplink radio resource control signaling carries the first information.

In an implementation, the fourth receiving unit 501 is configured to receive an SR sent by the first terminal device, wherein the SR carries the first indication information.

In an implementation, the fourth receiving unit 501 is configured to receive a BSR sent by the first terminal device, wherein the BSR carries the first indication information.

In the above implementations of the present disclosure, the first information is feedback information for sidelink data transmitted between the first terminal device and the second terminal device, and the second terminal device sends the feedback information to the first terminal device, then the first terminal device sends the feedback information to a network device, thereby, in NR V2X, the data sending end sends the feedback information for sidelink data to the network device, so that the network device can schedule resources or configure transmission parameters according to the feedback information.

An implementation of the present disclosure further provides a terminal device, including a processor and a memory configured to store a computer program which is runnable on the processor, wherein the processor is configured to perform the acts of the above information transmission method performed by the first terminal device when running the computer program.

An implementation of the present disclosure further provides a network device, including a processor and a memory configured to store a computer program which is runnable on the processor, wherein the processor is configured to perform the acts of the above information transmission method performed by the network device when running the computer program.

Figure 8:
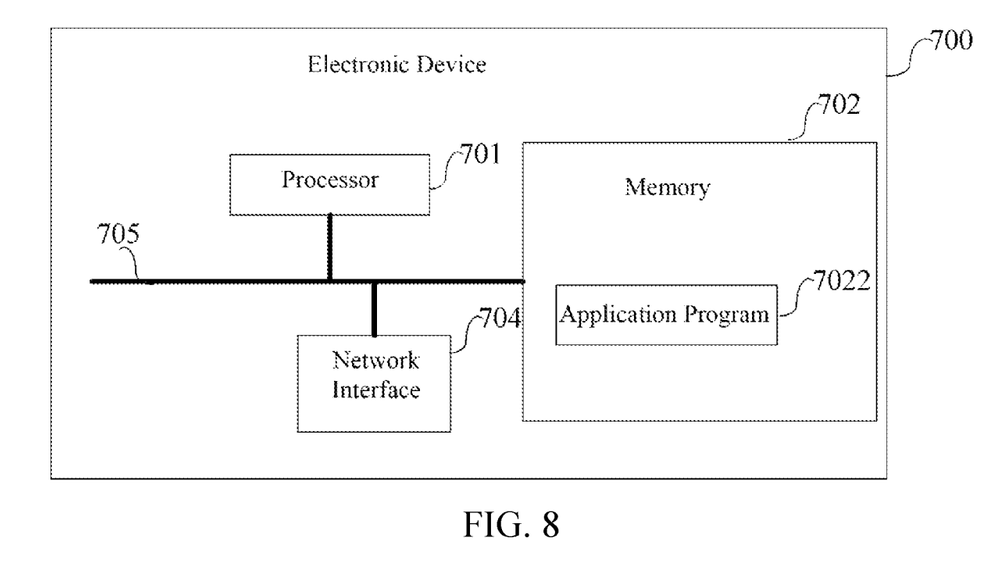
FIG. 8 is a schematic diagram of a hardware composition structure of an electronic device of an implementation of the present disclosure.

FIG. 8 is a schematic diagram of a hardware composition structure of an electronic device (network device or first terminal device) of an implementation of the present disclosure. The electronic device 700 includes at least one processor 701, a memory 702 and at least one network interface 704. Various components in the electronic device 700 are coupled together by a bus system 705. It may be understood that the bus system 705 is used for implementing connection and communication between these components. In addition to a data bus, the bus system 705 further includes a power bus, a control bus, and a status signal bus. However, for clarity, all kinds of buses are uniformly referred to as a bus system 705 in the FIG. 8.

It can be understood that the memory 702 may be a volatile memory or a non-volatile memory, or may include both the volatile memory and the non-volatile memory. In the above, the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM), wherein the magnetic surface memory may be a magnetic disk memory or a magnetic tape memory. The volatile memory may be a Random Access Memory (RAM) which serves as an external cache. By way of exemplary but not restrictive illustration, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in an implementation of the present disclosure is intended to include, but is not limited to, these and any other suitable types of memories.

The memory 702 in an implementation of the present disclosure is configured to store various types of data to support the operation of the electronic device 700. Examples of such data include any computer program for operating on the electronic device 700, such as an application program 7022. A program for implementing the method of an implementation of the present disclosure may be included in the application program 7022.

Methods disclosed in above implementations of the present disclosure may be applied in the processor 701 or implemented by the processor 701. The processor 701 may be an integrated circuit chip with a signal processing capability. In an implementation process, the acts of the methods described above may be accomplished by an integrated logic circuit of hardware in the processor 701 or instructions in a form of software. The above processor 701 may be a general-purpose processor, a Digital Signal Processor (DSP), or other programmable logic devices, discrete gates or transistor logic devices, discrete hardware components, etc. The processor 701 may implement or perform various methods, acts and logical block diagrams disclosed in the implementations of the present disclosure. The general purpose processor may be a microprocessor or any conventional processor or the like. Acts of the methods disclosed in combination with the implementations of the present disclosure may be directly embodied as being performed by a hardware decoding processor or may be performed by a combination of hardware and software modules in a decoding processor. The software module may be located in a storage medium, and the storage medium is located in the memory 702. The processor 701 reads information in the memory 702 and accomplishes the acts of the aforementioned methods in combination with hardware thereof.

In an exemplary implementation, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, Microprocessors or other electronic components, for performing the aforementioned methods.

An implementation of the present disclosure further provides a computer readable storage medium configured to store a computer program.

Optionally, the computer readable storage medium may be applied in a network device of an implementation of the present disclosure, and the computer program enables a computer to perform the corresponding processes implemented by the network device in various methods of the implementations of the present disclosure, which will not be repeated for sake of brevity.

Optionally, the computer readable storage medium may be applied in a terminal device of an implementation of the present disclosure, and the computer program enables a computer to perform the corresponding processes implemented by the terminal device in various methods of the implementations of the present disclosure, which will not be repeated for sake of brevity.

It should be understood that in the above implementations, "/" means "or". For example, A/B means A or B.

The present disclosure is described with reference to flowcharts and/or block diagrams of methods, devices (systems), and computer program products according to implementations of the present disclosure. It should be understood that each flow and/or block in the flowchart and/or block diagram, and a combination of flows and/or blocks in the flowchart and/or block diagram can be implemented by computer program instructions. These computer program instructions may be provided to a processor of a general purpose computer, a special purpose computer, an embedded processor or other programmable data processing device to produce a machine, such that the instructions which are executed by the processor of the computer or other programmable data processing devices produce a means for implementing functions specified in one or more flows in a flow chart and/or one or more blocks in a block diagram.

These computer program instructions may also be stored in a computer-readable memory that can direct a computer or other programmable data processing device to operate in a specific manner, such that the instructions stored in the computer-readable memory produce an article of manufacture including an instruction means that implements the functions specified in one or more flows in a flow chart and/or one or more blocks in a block diagram.

These computer program instructions may also be loaded onto a computer or other programmable data processing device, such that a series of operational acts are performed on the computer or other programmable devices to produce a computer-implemented process, thus the instructions which are executed on the computer or other programmable device provide acts for implementing the functions specified in one or more flows in a flow chart and/or one or more blocks in a block diagram.

The above descriptions are only preferred implementations of the present disclosure and are not intended to limit the protection scope of the present disclosure. Any modification, equivalent substitution, improvement, etc. made within the spirit and principles of the present disclosure shall be covered by the protection scope of the present disclosure.

What is claimed is:

1. An information transmission method, comprising:
   receiving, by a network device, Acknowledgement (ACK)/Non-Acknowledgement (NACK) information sent by a first terminal device; wherein the ACK/NACK information is obtained by the first terminal device according to information of a second sidelink channel sent by a second terminal device and received by the first terminal device, the ACK/NACK information is used for indicating whether sidelink data sent by the first terminal device to the second terminal device is correctly received by the second terminal device, the second sidelink channel comprises a sidelink feedback channel;
   sending downlink control information to the first terminal device, wherein the downlink control information carries second indication information, and the second indication information is used for determining a transmission resource for the ACK/NACK information;
   wherein receiving, by the network device, the ACK/NACK information sent by the first terminal device comprises:
      receiving, by the network device, an uplink control channel PUCCH sent by the first terminal device, wherein the PUCCH carries the ACK/NACK information;
      wherein the second indication information is used for determining a transmission resource of the PUCCH.

2. The method of claim 1, wherein that the second indication information is used for determining the transmission resource of the PUCCH comprises:
   the second indication information comprises index information which is used for determining a transmission resource from a plurality of PUCCH transmission resources configured by the network device.

3. The method of claim 1, wherein the downlink control information is used for allocating a sidelink transmission resource to the first terminal device.

4. The method of claim 1, wherein the PUCCH carries first information, and the first information comprises at least one of the following:
   beam index information;
   Channel Quality Indicator (CQI) information;
   Channel State indicator (CSI) information;
   Precoding Matrix Indicator (PMI) information;
   rank indicator information; and
   power indicator information.

5. The method of claim 4, wherein the beam index information is used for indicating a beam used by the first terminal device for sending the sidelink data to the second terminal device; the CQI information is used for indicating a channel quality between the first terminal device and the second terminal device.

6. The method of claim 4, wherein the CSI information is used for indicating a channel state between the first terminal device and the second terminal device; the PMI information is used for indicating precoding information used by the first terminal device for sending the sidelink data to the second terminal device.

7. The method of claim 4, wherein the rank indicator information is used for indicating rank information used by the first terminal device for sending the sidelink data to the second terminal device; the power indicator information is used for indicating to increase or decrease power, or to indicate power headroom information.

8. A network device comprising: a processor and a memory configured to store a computer program that is runnable on the processor, wherein when the computer program is run, the processor is configured to control the network device to:
   receive Acknowledgement (ACK)/Non-Acknowledgement (NACK) information sent by a first terminal device, wherein the ACK/NACK information is obtained by the first terminal device according to information of a second sidelink channel sent by a second terminal device and received by the first terminal device, the ACK/NACK information is used for indicating whether sidelink data sent by the first terminal device to the second terminal device is correctly received by the second terminal device, and the second sidelink channel comprises a sidelink feedback channel;

wherein the processor is configured to control the network device to send downlink control information to the first terminal device, wherein the downlink control information carries second indication information, and the second indication information is used for determining a transmission resource for the ACK/NACK information;

wherein receiving, by the network device, the ACK/NACK information comprises:

receiving, by the network device, an uplink control channel PUCCH sent by the first terminal device, wherein the PUCCH carries the ACK/NACK information;

wherein the second indication information is used for determining a transmission resource of the PUCCH.

9. The network device of claim 8, wherein that the second indication information is used for determining the transmission resource of the PUCCH comprises:

the second indication information comprises index information which is used for determining a transmission resource from a plurality of PUCCH transmission resources configured by the network device.

10. The network device of claim 8, wherein the downlink control information is used for allocating a sidelink transmission resource to the first terminal device.

11. The network device of claim 8, wherein the PUCCH carries first information, and the first information comprises at least one of the following:

beam index information;
Channel Quality Indicator (CQI) information;
Channel State indicator (CSI) information;
Precoding Matrix Indicator (PMI) information;
rank indicator information; and
power indicator information.

12. The network device of claim 11, wherein the beam index information is used for indicating a beam used by the first terminal device for sending the sidelink data to the second terminal device; the CQI information is used for indicating a channel quality between the first terminal device and the second terminal device.

13. The network device of claim 11, wherein the CSI information is used for indicating a channel state between the first terminal device and the second terminal device; the PMI information is used for indicating precoding information used by the first terminal device for sending the sidelink data to the second terminal device.

14. The network device of claim 11, wherein the rank indicator information is used for indicating rank information used by the first terminal device for sending the sidelink data to the second terminal device; the power indicator information is used for indicating to increase or decrease power, or to indicate power headroom information.

15. A first terminal device comprising: a processor and a memory configured to store a computer program that is runnable on the processor;

wherein when the computer program is run, the processor is configured to control the first terminal device to:
receive a second sidelink channel sent by a second terminal device,
obtain Acknowledgement (ACK)/Non-Acknowledgement (NACK) information according to information of the second sidelink channel, and
send the ACK/NACK information to a network device,
wherein the ACK/NACK information is used for indicating whether sidelink data sent by the first terminal device to the second terminal device is correctly received by the second terminal device,
wherein the second sidelink channel comprises a sidelink feedback channel; and
wherein the processor is further configured to receive downlink control information, wherein the downlink control information carries second indication information, and the second indication information is used for determining a transmission resource for the ACK/NACK information;
wherein the processor is configured to control the first terminal device to send an uplink control channel PUCCH to the network device, wherein the PUCCH carries the ACK/NACK information;
wherein the second indication information is used for determining a transmission resource of the PUCCH.

16. The first terminal device of claim 15, wherein that the second indication information is used for determining the transmission resource of the PUCCH comprises:

the second indication information comprises index information which is used for determining a transmission resource from a plurality of PUCCH transmission resources configured by the network device.

17. The first terminal device of claim 15, wherein the downlink control information is used for allocating a sidelink transmission resource to the first terminal device.

18. The first terminal device of claim 15, wherein the PUCCH carries first information, and the first information comprises at least one of the following:

beam index information;
Channel Quality Indicator (CQI) information;
Channel State indicator (CSI) information;
Precoding Matrix Indicator (PMI) information;
rank indicator information; and
power indicator information.

19. The first terminal device of claim 18, wherein the beam index information is used for indicating a beam used by the first terminal device for sending the sidelink data to the second terminal device; the CQI information is used for indicating a channel quality between the first terminal device and the second terminal device; the CSI information is used for indicating a channel state between the first terminal device and the second terminal device.

20. The first terminal device of claim 18, wherein the PMI information is used for indicating precoding information used by the first terminal device for sending the sidelink data to the second terminal device; the rank indicator information is used for indicating rank information used by the first terminal device for sending the sidelink data to the second terminal device; the power indicator information is used for indicating to increase or decrease power, or to indicate power headroom information.

* * * * *